United States Patent
Giebelhausen et al.

(10) Patent No.: US 6,316,378 B1
(45) Date of Patent: Nov. 13, 2001

(54) PROCESS FOR THE PRODUCTION OF SHAPED ACTIVATED CARBON

(75) Inventors: Jann-Michael Giebelhausen, Rathenow; Hubertus Spieker, Paderborn, both of (DE)

(73) Assignee: CarboTex, GmbH (DE)

( * ) Notice: Subject to any disclaimer, the term of this patent is extended or adjusted under 35 U.S.C. 154(b) by 0 days.

(21) Appl. No.: 09/526,297

(22) Filed: Mar. 15, 2000

(30) Foreign Application Priority Data

Mar. 18, 1999 (DE) .............................. 199 12 154

(51) Int. Cl.$^7$ .................................................. B01J 20/02
(52) U.S. Cl. ................. 502/10; 201/25; 201/38; 502/418; 502/432; 502/437
(58) Field of Search .............................. 502/10, 418, 437, 502/432; 201/38, 25

(56) References Cited

U.S. PATENT DOCUMENTS

| | | |
|---|---|---|
| 1,505,517 | 8/1924 | Woodruff et al. . |
| 3,041,116 | 6/1962 | Rosen et al. . |
| 3,533,961 | 10/1970 | Voet et al. . |
| 3,909,449 | 9/1975 | Nagai et al. . |
| 4,045,368 | 8/1977 | Katori et al. . |
| 4,118,341 | 10/1978 | Ishibashi et al. . |
| 4,237,107 | 12/1980 | Gillot et al. . |
| 4,344,821 | 8/1982 | Angelo, II . |
| 4,615,993 | 10/1986 | Schirmacher et al. . |
| 5,212,144 | 5/1993 | Schwartz, Jr. . |
| 5,416,056 | 5/1995 | Baker . |
| 5,510,063 | 4/1996 | Gadkaree et al. . |

FOREIGN PATENT DOCUMENTS

| | | |
|---|---|---|
| 26 06 368 | 8/1977 | (DE) . |
| 42 34 785 A1 | 4/1993 | (DE) . |
| 43 28 219 A1 | 2/1995 | (DE) . |
| 196 50 414 A1 | 2/1998 | (DE) . |
| 0 631 981 A1 | 1/1995 | (EP) . |
| 0 765 841 A2 | 4/1997 | (EP) . |
| 2 038 869 | 7/1980 | (GB) . |

*Primary Examiner*—Stuart L. Hendrickson
(74) *Attorney, Agent, or Firm*—Keusey, Tutunjian & Bitetto

(57) ABSTRACT

The invention relates to a process for the production of shaped activated carbon by steam activation in an continuously operating rotary tunnel kiln, by continuously drying spherically preformed raw materials in a rotary tunnel dryer with 6-fold product turnover per kiln rotation, with a product temperature of from 250 to 300° C. in the 50 to 80% kiln length range and a residence time of from 30 to 60 minutes by means of a hot gas in countercurrent, then, in an indirectly heated rotary tunnel kiln, which is subdivided into a carbonising zone and activating zone, continuously carbonising the material with 8-fold product turnover per kiln rotation and with a product temperature profile in the carbonising zone of from 850 to 900° C. and a residence time of from 120 to 180 minutes, and activating the material with a product temperature profile in the activating zone of from 910 to 920° C. and a residence time of from 480 to 720 minutes with the addition of steam in an inert-gas flow.

8 Claims, No Drawings

PROCESS FOR THE PRODUCTION OF SHAPED ACTIVATED CARBON

The invention relates to a process for the production of shaped activated carbon by steam activation in a continuously operating rotary tunnel kiln. The activated carbon has high quality and is versatile. It is used for gas and air purification, for solvent recovery, in particular for decolouring in the chemical and pharmaceutical industry and in water treatment.

DE 19 65 04 14 relates to the production of spherical adsorbents from ion exchangers, weakly acidic cation exchangers, precursors of ion exchangers and distillation residues. Anion exchangers, cation exchangers and the precursors of ion exchangers are carbonised under oxidising conditions at up to 750° C. and then activated. Styrene/divinylbenzenes in gel form are mixed with radical formers, pyrolized and activated. The spherical activated carbon from distillation residues is obtained by adding bitumen, extruding to form cylindrically shaped articles, pelletizing to form spheres, carbonising and activation. The said pyrolysis and activation conditions lead to an activated carbon of only medium quality with too low a yield. The mixing of styrene/divinylbenzenes in gel form with radical formers increases the production-engineering expenditure without leading to a substantial improvement in the activated carbon quality. The processing of distillation residues is only possible using high equipment expenditure. The quality level, especially abrasion resistance and hardness, of the activated carbon produced in this way is unsatisfactory.

The production of activated carbon beads from ion exchangers is described in DE 43 28 219. Granular organic ion exchangers of the gel type are carbonised in an inert atmosphere at 600–900° C. and activated at 800–900° C. in an oxidising atmosphere. The ion exchangers are pre-oxidised at temperatures of up to 400° C., the oxygen content being reduced as the temperature increases. The activation takes place by means of from 3 to 50 vol % of steam in a fluidised bed. In order to prevent agglomeration, the starting products are dusted with hard coal powder or activated carbon. The activated carbon beads which are produced have a pore distribution with a narrow spectrum of mesopores in the 100 to 300 Å range and only a few macropores. This narrow pore distribution and the low number of macropores significantly restrict the use of the activated carbon beads. A prerequisite for a broad application spectrum of activated carbon is an open pore distribution over the entire pore range, covering micro-, meso- and macropores. A large number of macropores is important for the diffusion of the molecules to be absorbed. The diffusion is the speed determining step when activated carbon is used. Another disadvantage is that, under the conditions according to the invention, it is not possible to produce a high-quality activated carbon with defined and variable pore size distribution and sufficient yield.

U.S. Pat. No. 3,533,961 describes a method for the production of spherical activated carbon from powdered carbon material such as soot, bituminous coal, anthracite, charcoal and pitch as binder. A spherical activated carbon is produced by agglomeration, drying, charring and activation.

Processes for the production of spherical activated carbon from pitch by solvent agglomeration and activation in an ammonia atmosphere at from 550 to 1000° C. and additional steam treatment are disclosed by U.S. Pat. Nos. 3,909,449 and 4,045,368.

U.S. Pat. No. 3,041,116 describes a process for the production of spherical carbonaceous material and spherical activated carbon from pitch and amorphous coal particles with a viscosity modifier.

These processes are expensive in terms of equipment and engineering, since the production of spherical starting materials requires additional process stages. The production of shaped activated carbon with very high absorption capacity and BET surface area is limited by the reduction in hardness and abrasion resistance as the degree of activation increases, this being due to the nature of the process.

The object of the invention is to produce high-quality, versatile shaped activated carbon on a continuous scale from various carbon-based materials. For production engineering reasons, the shaped activated carbon should be substantially free of adhering dust and, besides a high adsorption capacity, should also have a high packing density.

The shaped activated carbon is produced from spherical raw materials which contain at least 3% volatile components and at most 40% ash, both expressed in terms of solids content, such as polymer resins, acetylene coke and pearl cellulose, by steam activation in an indirectly heated, continuously operating rotary tunnel kiln.

According to the invention, the preformed spherical starting product is delivered to a rotary tunnel dryer preheated to from 880° C. to 900° C. up to a filling level of from 10% to 20% of the kiln volume, a product temperature of from 250° C. to 300° C. is set up in the dryer in the 50% to 80% kiln length range, calculated from the product input, and the material is dried continuously with 6-fold product turnover per kiln rotation by means of a hot gas in countercurrent with a residence time of from 30 to 60 minutes to a residual moisture content of at least 10%, then transferred to an indirectly heated rotary tunnel kiln, which is subdivided into a carbonising zone and activating zone, up to a filling volume of from 5 to 12%, and carbonised and activated continuously in an inert-gas flow with 8-fold product turnover per kiln rotation and a product temperature profile in the carbonising zone of from 850 to 900° C., the residence time being from 120 to 180 minutes, and a product temperature profile in the activating zone of from 910 to 920° C., with a residence time of from 480 to 720 minutes, with the addition of from 3 to 5 kg/h.kg of steam in the activating zone.

In the rotary tunnel dryer, the product is transported with a speed of from 6 to 17 cm/min. The flow rate of the hot gas, expressed in terms of the free cross-section of the kiln, is from 0.2 to 0.5 m/s, with a kiln length to kiln diameter ratio of from 5.5 to 10.

The carbonising and activation take place in a rotary tunnel kiln, the carbonising zone covering 20% and the activating zone covering 80% of the heated kiln length. In the carbonising zone, there is no addition of steam and the product temperature profile, calculated in terms of the heated kiln length from the product input, is 850° C. at the product input, 880° C. after 10% of the kiln length and 900° C. after 20% of the kiln length. The activation is carried out with a product temperature profile of 910° C. after 30% of the kiln length, 920° C. after from 40 to 70% of the kiln length, 915° C. after 80% of the kiln length and 910° C. at the product output. The transfer speed through the carbonising zone and the activating zone is from 10 to 30 cm/min, with a kiln length to kiln diameter ratio of from 10 to 30. The steam is passed through the kiln with a flow rate of from 0.1 to 0.4 m/s, with an allowable reduced pressure of from 0.5 to 2.0 mm water column on the flue-gas side.

The shaped activated carbon produced according to the invention from various carbon-based spherical materials also has, besides a very high adsorption capacity and a very good desorption capability, outstanding abrasion resistance. Because of the high packing density and the open-pore structure, the shaped activated carbon is suitable for a wide variety of fields of use, in particular gas and air purification, solvent recovery, decolouring and in water treatment. The extremely low adhering and free dust content of the shaped activated carbon and its repeated regenerability are of particular advantage for practical application. The low equipment expenditure and the high qualitative yield permit economical production of very high-quality shaped activated carbon on a continuous scale.

The invention will be explained in more detail with the aid of the following embodiment examples.

EXAMPLE 1

Spherically preformed polymer resin with the specification:

| | | | |
|---|---|---|---|
| Water content: | 48.5% | | |
| Volatile components: | 59.0% (dry) | | |
| Fixed carbon: | 37.4% (dry) | | |
| Ash | 3.6% (dry) | | |
| Sulphur content: | 15.2% (dry) | | |
| Particle size: | <1.25 mm | 0.1% | |
| | 1.25–1.00 mm | 4.2% | |
| | 1.00–0.80 mm | 40.0% | |
| | 0.80–0.50 mm | 053.6% | |
| | <0.50 mm | 2.1% | | was delivered to a rotary tunnel dryer pre-heated to 900° C. up to a filling level of 20% of the kiln volume, a product temperature of 300° C. was set up in the 70% kiln length range, calculated from the product input, and the material was dried continuously by means of a hot gas fed in countercurrent with a residence time of 45 minutes to a residual moisture content of 5.8%. The transport speed in the rotary tunnel dryer was 11.1 cm/min, while the hot gas was fed through the kiln with a flow rate of 0.43 m/s, expressed in terms of free cross-section. The kiln length to kiln diameter ratio was 5.5. The rotary tunnel dryer had lifting scoops which ensured 6-fold product turnover per kiln rotation.

The carbonising and activation were then carried out continuously in an inert-gas flow according to the co-current principle in an indirectly heated rotary tunnel kiln whose volume was filled to 11% with product and which had lifting scoops that turned over the product eight times per kiln rotation. The carbonising zone covered 20% and the activating zone covered 80% of the heated kiln length, calculated from the product input. For the carbonising zone, a product temperature profile of 850° C. at the product input, 880° C. after 10% of the kiln length and 900° C. after 20% of the kiln length was set up, in each case in terms of the heated kiln length and calculated from the product input. The carbonising took place without the addition of steam, with a product residence time of 128 minutes.

For the activation zone, the product temperature profile was 910° C. after 30% of the kiln length, 920° C. throughout the 40 to 70% range of the kiln length, 915° C. after 80% of the kiln length and 910° C. at the product output. The activating zone received 4 kg/h.kg of steam which was fed through the kiln with a flow rate of 0.3 m/s, with a reduced pressure of 1.5 mm water column on the flue-gas side and a product residence time of 514 minutes.

The delivery rate of the product in the carbonising zone and the activation zone was 28 cm/min, with a kiln length to kiln diameter ratio of 12.

The shaped activated carbon was then cooled and the nominal particle fraction from 0.315 to 0.8 mm was screened. The shaped activated carbon produced according to the invention is characterised by the following quality parameters:

| | | | |
|---|---|---|---|
| Packing Density | 565 g/l | | |
| Ash | 0.4% | | |
| Iodine number | 1460 mg/g | | |
| Methylene blue titre | 36.7 ml | | |
| BET surface area | 1480 m²/g | | |
| Abrasion strength | 100% | | |
| Dust content, adhering | <0.1% | | |
| Dust content, free | <0.1% | | |
| Regeneration loss | 2% | | |
| Particle size: | >0.80 mm | 0.1% | |
| | 0.80–0.50 mm | 10.40% | |
| | 0.50–0.40 mm | 76.5% | |
| | 0.40–0.315 mm | 12.8% | |
| | <0.315 mm | 0.2% | |

The shaped activated carbon is outstandingly suitable for use in gas and air purification, solvent recovery, decolouring in the chemical and pharmaceutical industry and in water purification. It has very good adsorption and desorption properties and a very high abrasion strength. It is repeatedly regenerable.

EXAMPLE 2

Acetylene coke with the following quality specification was used as a starting product for the production according to the invention of high-quality shaped activated carbon:

| | | | |
|---|---|---|---|
| Water content: | 15.8% | | |
| Volatile components: | 12.2% (dry) | | |
| Fixed carbon: | 87.7% (dry) | | |
| Ash: | 0.1% (dry) | | |
| Particle size: | >1.00 mm | 21.2% | |
| | 1.00–0.80 mm | 12.0% | |
| | 0.80–0.50 mm | 14.2% | |
| | 0.50–0.40 mm | 26.4% | |
| | 0.40–0.70 mm | 26.0% | |
| | <0.20 mm | 0.2% | |

The spherically preformed acetylene coke was delivered up to a filling level of 20% to a rotary tunnel dryer pre-heated to 900° C., a product temperature of 300° C. was set up in the 50% kiln length range, calculated from the product input, and the material was dried continuously by means of a hot gas fed in countercurrent with a residence time of 30 minutes to a residual moisture content of 0.5%. The transport speed in the rotary tunnel dryer was 16.7 cm/s and the flow rate of the hot gas was 0.3 m/s, expressed in terms of free cross-section. The kiln length to kiln diameter ratio was 5.5. The rotary tunnel dryer had lifting scoops which allowed 6-fold product turnover per kiln rotation. The carbonising and activation were then carried out continuously in the indirectly heated rotary tunnel kiln with 8-fold product turnover per kiln rotation and with a constant filling level of 5% in co-current with inert gas. In the carbonising zone, which covered 20% of the heated kiln length, a product temperature profile of 850° C. at the product input, 880° C. after 10% of the kiln length and 900° C. after 20% of the kiln length was set up, in each case in terms of the heated kiln length and calculated from the product input. The carbonising took place without the addition of steam, with a product residence time of 180 minutes. In the activating zone, a product temperature profile of 910° C. after 30% of the kiln length, 920° C. throughout the 40 to 70% range of the kiln length, 915° C. after 80% of the kiln length and 910° C. at the product output was set up. 5 kg/h.kg of steam was fed through the activation zone with a flow rate of 0.4 m/s and with a reduced pressure of 2.0 mm water column on the flue-gas side, with the product residence time being 720 minutes.

The delivery rate for the product in the carbonising zone and the activation zone was 20 cm/min, with a kiln length to kiln diameter ratio of 12. After the activation, the shaped activated carbon was cooled and screened.

The shaped activated carbon produced according to the invention from acetylene coke has the following quality specification:

| | | |
|---|---|---|
| Packing Density | 480 g/l | |
| Ash | 1.2% | |
| Iodine number | 1355 mg/g | |
| Methylene blue titre | 30.8 ml | |
| BET surface area | 1385 m²/g | |
| Abrasion strength | 100% | |
| Dust content, adhering | <0.1% | |
| Dust content, free | <0.1% | |
| Regeneration loss | 2% | |
| Particle size: | >0.80 mm | 3.4% |
| | 0.80–0.50 mm | 18.9% |
| | 0.50–0.40 mm | 61.1% |
| | 0.40–0.315 mm | 16.4% |
| | <0.315 mm | 0.2% |

It is especially suitable for universal use in gas and air purification, with a particular emphasis on breathing protection and petrol-fume adsorption.

EXAMPLE 3

Pearl cellulose with the following quality parameters was used for the production according to the invention of shaped activated carbon:

| | | |
|---|---|---|
| Water content: | 65.7% | |
| Volatile components: | 82.4% (dry) | |
| Fixed carbon: | 14.2% (dry) | |
| Ash: | 3.4% (dry) | |
| Particle size: | >1.00 mm | 2.1% |
| | 1.00–0.80 mm | 10.4% |
| | 0.80–0.50 mm | 87.3% |
| | <0.50 mm | 0.2% |

The spherically preformed pearl cellulose was delivered to a rotary tunnel dryer pre-heated to 880° C. up to a filling level of 10% of the kiln volume, a product temperature of 250° C. was set up in the 50% kiln length range, calculated from the product input, and the material was dried continuously by means of a hot gas, which was fed through the kiln in countercurrent, with a residence time of 60 minutes to a residual moisture content of 9.5%. The product was delivered in the dryer with a speed of 8.3 cm/min. The flow rate of the hot gas was 0.5 m/s, expressed in terms of the free cross-section of the kiln, and the kiln length to kiln diameter ratio was 5.5. Built-in lifting scoops ensured 6-fold product turnover per kiln rotation.

The carbonising and activation took place continuously in an indirectly heated rotary tunnel kiln with a filling level of 12% according to the co-current principle with an inert gas and 8-fold product turnover per kiln rotation. The carbonising zone and the activating zone were in a ratio of 20% to 80% in the rotary tunnel kiln. The product passed through the carbonising zone with a product temperature profile of 850° C. at the product input 880° C. after 10% of the kiln length 900° C. after 20% of the kiln length in each case in terms of the heated kiln length and calculated from the product input, with a residence time of 120 minutes, and the activating zone with a product temperature profile of 910° C. after 30% of the kiln length 920° C. throughout the 40 to 70% range of the kiln length 915° C. after 80% of the kiln length 910° C. at the product output also expressed in terms of the heated kiln length and calculated from the product input, with a residence time of 480 minutes. The activating zone received 3 kg/h.kg of steam with a flow rate of 0.3 m/s and with a reduced pressure of 1.0 mm water column on the flue-gas side. The product was delivered in the rotary tunnel kiln with a speed of 30 cm/min. The kiln length to kiln diameter ratio was 12.

The activated carbon was then cooled and the nominal particle fraction was screened.

The shaped activated carbon produced according to the invention from pearl cellulose is distinguished by the following quality features:

| | | |
|---|---|---|
| Packing Density | 450 g/l | |
| Ash | 3.2% | |
| Iodine number | 1400 mg/g | |
| Methylene blue titre | 32.3 ml | |
| BET surface area | 1420 m²/g | |
| Abrasion strength | 98% | |
| Dust content, adhering | <0.1% | |
| Dust content, free | <0.1% | |
| Regeneration loss | 4% | |
| Particle size: | >0.80 mm | 0.2% |
| | 0.80–0.50 mm | 12.3% |
| | 0.50–0.40 mm | 70.7% |
| | 0.40–0.315 mm | 16.7% |
| | <0.315 mm | 0.1% |

The shaped activated carbon has outstanding adsorption and production-engineering properties. It is versatile and can preferably be used for decolouring and for water treatment in fluidised and fixed bed filters.

What is claimed is:

1. Process for the production of shaped activated carbon from spherically preformed raw materials which contain at least 3% volatile components and at most 4% ash, expressed in terms of solids content, by steam activation in an inert-gas flow in an indirectly heated, continuously operating rotary tunnel kiln, characterised in that the spherically preformed raw material is delivered to a rotary tunnel dryer pre-heated to from 880 to 900° C. up to a filling volume of from 10 to 20%, a product temperature of from 250 to 300° C. is set up in the dryer in the 50 to 80% kiln length range, calculated from the product input, and the material is dried continuously with 6-fold product turnover per kiln rotation and a residence time of from 30 to 60 minutes by means of a hot gas in countercurrent to a residual moisture content of at least 10%, then the dried product is transferred up to a filling volume of from 5 to 10% to an indirectly heated rotary tunnel kiln, which is subdivided into a carbonising zone and activating zone, and is carbonised and activated continuously in an inert-gas flow with 8-fold product turnover per kiln rotation and with a product temperature profile in the carbonising zone of from 850 to 900° C. and a residence time of from 120 to 180 minutes, and with a product temperature profile in the activating zone of from 910 to 920° C. and a residence time of from 480 to 720 minutes with the addition of from 3 to 5 kg/h.kg of steam in the activating zone.

2. Process according to claim 1, characterised in that the raw material is transported in the rotary tunnel dryer with a speed of from 6 to 17 cm/min.

3. Process according to claim 1, characterised in that the flow rate of the hot gas in the dryer, expressed in terms of free cross-section, is from 0.2 to 0.5 m/s, with a kiln length to kiln diameter ratio of from 5.5 to 10.

4. Process according to claim 1, characterised in that the carbonising zone covers 20% and the activating zone covers 80% of the heated kiln length, calculated from the product input.

5. Process according to claim 1, characterised in that the carbonising takes place with a product temperature profile, calculated in terms of the heated kiln length from the product input, of 850° C. at the product input, 880° C. after 10% of the kiln length and 900° C. after 20% of the kiln length.

6. Process according to claim 1, characterised in that the activation takes place with a product temperature profile, calculated in terms of the heated kiln length from the product input, of 910° C. after 30% of the kiln length, 920° C. after from 40 to 70% of the kiln length, 915° C. after 80% of the kiln length and 910° C. at the product output.

7. Process according to claim 1, characterised in that the product is transferred through the carbonising zone and the activating zone with a speed of from 10 to 30 cm/min, with a kiln length to kiln diameter ratio of from 10 to 30.

8. Process according to claim 1, characterised in that the steam flows through the activating zone at a rate of from 0.1 to 0.4 m/s with a reduced pressure on the flue-gas side of 0.5–2.0 mm water column.

* * * * *